March 26, 1963     J. C. CHUPA     3,082,479
POROUS MOLD
Filed Dec. 10, 1954

INVENTOR.
JOHN C. CHUPA
BY
Ely, Frye & Hamilton
ATTORNEYS

United States Patent Office 3,082,479
Patented Mar. 26, 1963

3,082,479
POROUS MOLD
John C. Chupa, Sandusky, Ohio, assignor to The Barr Rubber Products Company, Sandusky, Ohio, a corporation of Ohio
Filed Dec. 10, 1954, Ser. No. 474,436
2 Claims. (Cl. 18—39)

This invention relates to apparatus for producing hollow articles, such as dolls, balls and other toys and similar articles, from liquid mixes such as (1) latex or like aqueous dispersions of rubber or rubber-like material commonly known in the art as "latex" or (2) synthetic resins compounded with suitable plasticizers and other ingredients, particularly polyvinyl chloride and similar vinyl polymers and copolymers combined with suitable plasticizers, commonly known in the art as "vinyls."

It is the major purpose of the present invention to improve upon the manufacture of such objects by providing manufacturing means which are more economical, simpler, faster and more versatile than those of the prior art.

Accordingly, this application is intended to disclose the details of preferred means for attaining the results contemplated by the invention. While such details are given to a sufficient extent to freely enable the art to employ the invention, variations and modifications may be resorted to while still attaining the benefits of the invention, and the scope of the invention is defined in the appended claims.

The invention is illustrated in connection with the manufacture of hollow balls, but it will be understood that the invention may be employed in the manufacture of other articles by suitable and obvious adaptations of the basic principles thereof.

The invention contemplates formation of the article in a porous mold in which the article may be contained after its initial formation and through which fluids and heat may be transferred in either direction to accomplish several results, as fully explained below. The invention is applicable both to rotary casting and slush molding operations. The invention makes possible consolidation of certain processing operations, automatic release of the formed articles from the mold, a variety of finishes in different areas of the formed article, elimination of the "greasy" feel presently typical of vinyl toys without the necessity of any separate "degreasing" operations.

The above and other objects and advantages of the invention will become fully apparent to experts in the art from a reading of the following specification of the invention.

Figure 1:
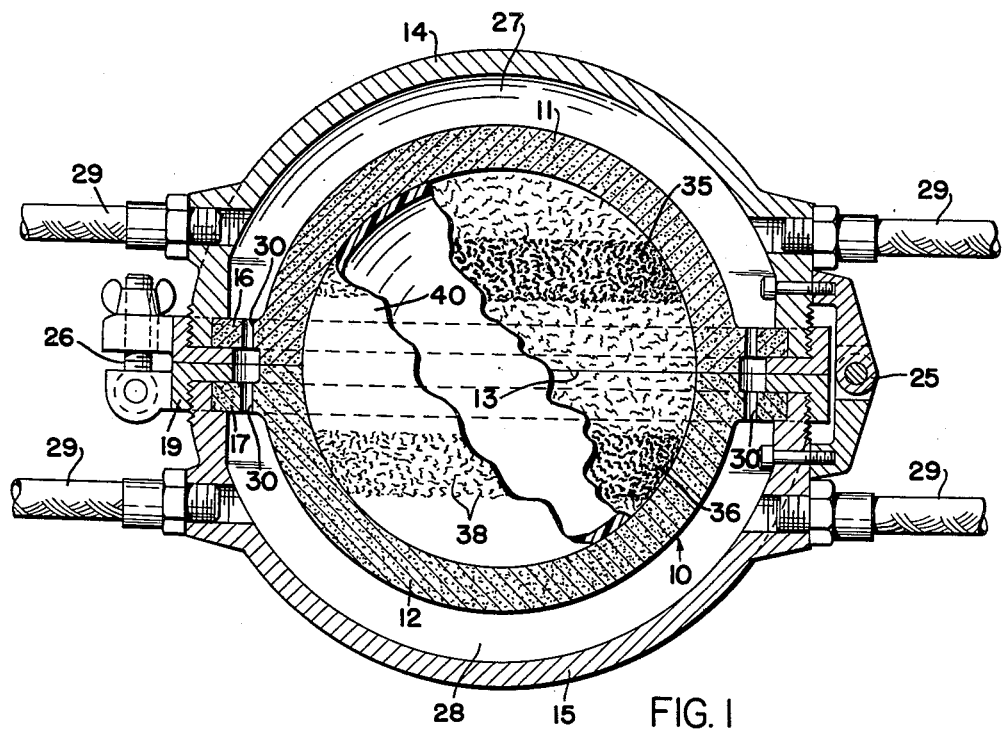
Figure 2:
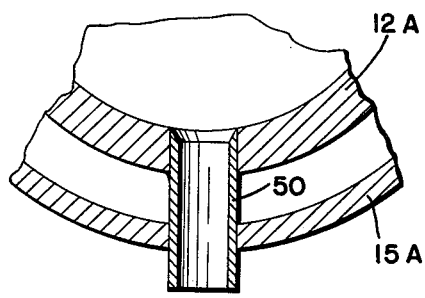

In the accompanying drawings, FIGURE 1 is a view in cross-section illustrating a mold assembly for rotational casting, and FIGURE 2 is a fragmentary view of the bottom portion of the structure shown in FIGURE 1, modified for slush-casting operations.

In FIGURE 1 a sectional mold 10 is illustrated comprising a pair of porous walls 11 and 12 meeting at a parting line 13. The mold halves are fixed to supporting envelope housings 14 and 15. The mold halves may have annular flanges 16 and 17 which are anchored to their corresponding housing 14 or 15 by annular rings 18 and 19, as shown, the annular rings contacting each other to define, or have a part in defining, the closed position of the mold halves, in a manner which will be apparent from the drawings. The mold assembly halves are hinged together at 25 and are releasably held in closed position by appropriate latch means 26.

The mold assembly as illustrated defines chambers 27 and 28 between the supporting envelope housings and the porous mold halves. Fluid lines 29 communicate with these chambers as indicated. The lines 29 may be flexible hoses which, in turn, communicate with valve and manifold means and other suitable means, the choice of which is a matter of mechanical expediency, in order that vacuum or various fluids under pressure may be supplied through the lines 29 in desired sequence while accommodating opening, rotation or other handling of the mold assembly. It will be understood that the mold assembly may form part of a battery of similar molds mounted for movement together, in which event hinge and latch means may not be provided for each individual mold but rather for the battery as a whole. It will also be apparent that a common supporting envelope may be provided for a plurality of individual molds rather than providing the individual mold with its individual envelope, as illustrated.

It is generally important that uniformity of conditions be maintained around the entire extent of the porous mold, and to this end the passages 30 are formed in the flanges 16 and 17 so that the space between these flanges is, in general, subjected to the same conditions of heat, pressure and content as apply within the chambers 27 and 28 at any given time.

The choice of the particular mold materials which will function successfully with the particular mix being employed is within the routine skill of the art. The mold sections 11 and 12 may comprise porous bodies formed from sintered bronze or from other powdered metals, such as nickel, German silver, stainless steel or chrome-plated cast iron, the formation of such bodies being according to conventional techniques in the art of powdered metal fabricating.

It is a familiar fact that slight traces of copper will completely destroy latex dispersions, and for this reason bronze molds are apparently to be avoided if fabrication of latex articles is contemplated. However, I have discovered that bronze, particularly desirable as an economical mold material, may be utilized for latex molding by fabricating a porous metal mold from powdered bronze by conventional methods and thereupon plating the inner surface of the mold with chrome, tin, cadmium, zinc, or other suitable material. Even a plating which extends just below the inner surface of the mold is effective to render the mold operative for latex processing. In one example, I successfully employed bronze molds for latex casting in which the inner surface of the mold was chrome-plated, such chrome-plating extending to about ⅛ inch below the inner mold surface. Because this mold was comprised of fairly fine particles of diameters within the range of .0005″ to .001″, plating throughout the mold thickness was unfeasible.

I have successfully formed articles from porous molds formed from particles in several diameter ranges, as set forth below.

| Vinyl, inches | Latex, inches |
|---|---|
| .0005–.001 | .0005–.001 |
| .001–.002 | .001–.002 |
| .002–.005 |  |

These particular molds were formed from powdered bronze, the molds employed with latex being chrome-plated, as outlined above. The mold die or matrix in each case was a carved carbon block, and mold pressure in each case approached, but did not exceed, the pressure at which the die or matrix would fail. Metal dies or matrices may be employed, but their relatively high cost makes them less preferable.

According to the invention, portions of the inside surface of the porous mold may be etched with solvents or acids to change the character of the mold surface at such portions. In the illustrated mold, the portions 35 and 36 on the inside surface of the mold have been so etched to form relatively coarse-grained bands. The molded article is thereby decorated with corresponding furry or napped bands, such as indicated at 38. The inside surface of the mold may be etched in different degrees in different areas. The entire inner surface may be covered by areas etched to different degrees, if desired.

In utilizing the invention, as, for example, to produce the ball 40 from latex, the opened mold is placed in a horizontal position and a measured charge placed therein. The mold is then closed and rotated around a plurality of planes or otherwise moved to distribute the charge around the interior of the mold according to conventional techniques known in the art as casting, or rotational casting. Moisture is absorbed from the distributed charge into the porous mold walls to cause the charge to set or dry. Conventional rotational casting techniques include the rotation of the mold at varying rates of speed as may be most satisfactory for purposes of a particular production set up. Withdrawal of moisture may be accelerated by circulating dry hot air through the lines 29 and chambers 27 and 28 and also by subjecting these lines to a vacuum which may be alternately applied and relieved to substantially increase the rate of moisture withdrawal over that which would obtain if capillary action alone were relied on. Rotational movement may be discontinued after the charge is sufficiently set to retain its distributed position within the mold. Final drying or curing may be effected within the mold by heating the mold structure within a heating chamber or by circulating a heating medium at curing temperature through the chambers 27 and 28. Accordingly, the latex article may be completely formed prior to its removal from the mold. Mold release may be aided by introduction of air or other suitable medium under pressure into the chamber 27 or 28 or both to exert a releasing pressure on the interior walls of the porous mold. In the illustrated mold, the release pressure established within the chambers 27 and 28 would be high enough to exert appreciable pressure at the interior of the porous mold, despite the leakage or by-pass through the passages 30 when the mold assembly is opened.

In utilizing the invention to produce an article from heat-sensitive latex or latex containing a heat-setting agent, the mold may be preheated or heated by a circulation of a suitable heating medium through the chambers 27 and 28 at any time and for any desired interval during distribution of the charge over the mold walls by rotational casting. Again, the formed article may be dried within the mold by application of heating and drying media such as warm dry air within the chambers 28. Setting and drying may be further promoted by application of a vacuum to aid in moisture withdrawal.

Successful rotational or slush molding of hollow vinyl articles has heretofore been largely confined to so-called plastisols in which a non-volatile plasticizer is provided for the vinyl resin. The use of volatile plasticizers has been precluded because of the surface flaws, fissures, and severe deformation of the final article resulting from the blowing of the volatizing solvent. According to the present invention, such blowing is accommodated by the porous mold which, at the same time, may be heated to gel, set, and, if desired, finally cure the formed article.

The vinyl charge may be placed in the mold and rotationally cast while heating the porous mold within an oven or by circulation of suitable heating media through the chambers 27 and 28. If volatile plasticizers are employed, vacuum may be applied within the chambers 27 and 28 to promote the ready escape of the volatized plasticizer through the porous mold walls. If plasticizers are non-volatile, it may be desirable to "degrease" the final product by immersion thereof in a suitable solvent bath or vapor.

Heating and cooling of the molds to any desired temperature may be performed in any desired sequence, and each heating or cooling step may be continued throughout any desired interval in order to carry out gelling and fusing of the distributed charge.

Suitable heating and cooling temperatures for a wide range of charge formulations will be known to those skilled in this art, such temperatures generally paralleling those employed in conventional processes employing the same or similar materials, such as the process disclosed in U.S. Patent No. 2,469,892 to Rempel relating to latex processing, the process disclosed in U.S. Patent No. 1,998,897 to Kay relating mainly to processing of latex provided with a heat-setting agent, and the process disclosed in U.S. Patent No. 2,629,134 to Molitor relating to vinyl casting. The materials and formulations mentioned in the above patents may be employed in the present invention. Another vinyl formulation which I have employed is set forth below:

| | Parts by weight |
|---|---|
| High molecular weight polyvinyl chloride in form of a fine white powder, specific gravity approx. 1.4 | 60 |
| Polyvinylchloride acetate copolymer, 96%+vinyl chloride, less than 4% vinyl acetate | 13⅓ |
| Triethylene glycol di-(2-ethyl hexoate) | 13⅓ |
| Dioctyl phthalate | 13⅓ |
| Cadmium naphthenate dissolved in plasticizer-type carrier, approx. 1:1 (stabilizer) | 2 |
| Titanox (color) | 3 |

As previously indicated, conventional vinyl casting and slush molding procedures are limited to use of non-volatile plasticizers. The present invention may employ the formulation set forth below which will produce an article which comes from the mold devoid of the "greasy" feel heretofore characteristic of molded vinyl articles:

| | Parts by weight |
|---|---|
| High molecular weight polyvinyl chloride in form of a fine white powder, specific gravity approx. 1.4 | 60 |
| Polyvinylchloride acetate copolymer, 96%+vinyl chloride, less than 4% vinyl acetate | 7½ |
| Methylethyl ketone | 25 |
| Dioctyl phthalate | 7½ |
| Cadmium naphthenate dissolved in plasticizer-type carrier, approx. 1:1 (stabilizer) | 2 |
| Titanox (color) | 3 |

The invention is adapted to slush molding operations in which the porous mold is filled with the liquid mix, the portions of the mix adjacent the mold walls are caused to gel or set, and the excess central liquid is then poured out by gravity or by injection of a gas under pressure. Aqueous dispersions of latex have heretofore been slush molded in porous plaster molds, but in such operations only a preliminary set was accomplished in the mold. In slush molding according to the present invention, the same considerations apply as outlined above with respect to casting operations, the obvious difference however being that distribution of the material on the mold wall is accomplished by the handling technique commonly characterized as slush molding. Distribution over the mold surface preliminary to initial gelling or setting is accomplished by filling the mold cavity rather than by rotational movement of the mold, the residue or liquid being emptied from the mold following such initial gelling or setting. For example, as shown in FIGURE 2, a mold assembly similar to that shown in FIGURE 1 may be employed, the mold, however, being provided with a neck 50 of non-porous metal which extends through the wall 15A. In slush molding of latex, this mold is inverted from the position indicated in FIGURE 2, filled, and a preliminary gel or set accomplished by withdrawal of moisture aided by vacuum and circulation of a drying and heating medium as outlined previously in connection with the discussion of rotational casting. The mold is then again inverted to the position indicated in FIGURE 2, causing the excess central liquid mix to be slushed out, and final treatment within the mold is then carried forward as desirable. In slush molding of vinyls or heat-sensitive latex, the handling is similar, but the preliminary gel against the mold walls is accomplished essentially or at least partially through the application of heat rather than by moisture withdrawal.

It should be apparent that molding according to the present invention may be accomplished by manually controlling or performing the various operations on the porous metal mold contemplated by the invention or that control or performance of such various operations may be accomplished automatically by the provision of suitable mechanical means to handle, transpose and control as desired.

The invention is not limited to specific details of the above disclosure, which disclosure will suggest to the art a variety of means to practice the invention. The scope of the invention is defined in the following claims.

What is claimed is:

1. Molding apparatus comprising a sectional mold of porous metal, the inner surface of said mold having sharply defined areas selectively etched to different degrees, whereby articles molded therein are decorated with sharply defined areas of different textures.

2. Molding apparatus comprising a sectional mold of porous metal, the inner surface of said mold having sharply defined areas which are etched and other sharply defined areas which are not etched, whereby articles molded therein are decorated with sharply defined areas of different textures.

References Cited in the file of this patent

UNITED STATES PATENTS

| | | |
|---|---|---|
| 1,373,121 | Emery | Mar. 29, 1921 |
| 1,592,536 | O'Neill | July 13, 1926 |
| 2,345,112 | Grundel | Mar. 28, 1944 |
| 2,434,780 | Wiss et al. | Jan. 20, 1948 |
| 2,469,892 | Rempel | May 10, 1949 |

FOREIGN PATENTS

| | | |
|---|---|---|
| 725,100 | Great Britain | Mar. 2, 1955 |